United States Patent [19]

Lyons et al.

[11] Patent Number: 5,140,243
[45] Date of Patent: Aug. 18, 1992

[54] DISCRETE POSITION ESTIMATOR FOR A SWITCHED RELUCTANCE MACHINE USING A FLUX-CURRENT MAP COMPARATOR

[75] Inventors: James P. Lyons, Niskayuna; Stephen R. Macminn, Schenectady; Mark A. Preston, Niskayuna, all of N.Y.

[73] Assignee: General Electric Company, Schenectady, N.Y.

[21] Appl. No.: 760,039

[22] Filed: Sep. 13, 1991

[51] Int. Cl.$^5$ ............................................... H02P 8/00
[52] U.S. Cl. .................................................. 318/701
[58] Field of Search ........................ 318/701, 138, 254

[56] References Cited

U.S. PATENT DOCUMENTS 4,470,000 9/1984 Heinle ................................. 318/805

FOREIGN PATENT DOCUMENTS 54-119968 9/1979 Japan .

Primary Examiner—David Smith
Attorney, Agent, or Firm—Jill M. Breedlove; James C. Davis, Jr.; Marvin Snyder

[57] ABSTRACT

A rotor position estimator for a switched reluctance motor (SRM) employs a flux-current map to determine whether the actual rotor angle is closer to, or farther from, axial alignment of stator and rotor poles than a reference angle $\theta_r$. The flux-current map is a plot of reference flux $\Psi_r$ as a function of current for the reference angle $\theta_r$. If a flux linkage estimate $\hat{\Psi}_i$ is greater than the reference flux $\Psi_r$, then the actual rotor angle is closer to alignment than the reference angle $\theta_r$, and the flux-map comparator output is a logic level one. If the flux linkage estimate $\hat{\Psi}_i$ is lower than the reference flux $\Psi_r$, then the actual rotor angle is farther from alignment than the reference angle $\theta_r$, and the flux-map comparator output is a logic level zero. When the result of the flux comparison causes the flux-current map comparator to change state, the actual rotor angle is equal to the reference angle $\theta_r$, with the result that phase currents can be successfully commutated relative to this rotor position. The flux-current map can be implemented using either single-phase or multi-phase SRM flux-current characteristics.

6 Claims, 6 Drawing Sheets

SHAFT ANGLE TRANSDUCER 48

ROTOR ANGLE FEEDBACK, $\theta$
TO CONTROL MEANS 50
(SEE FIG. 1B)

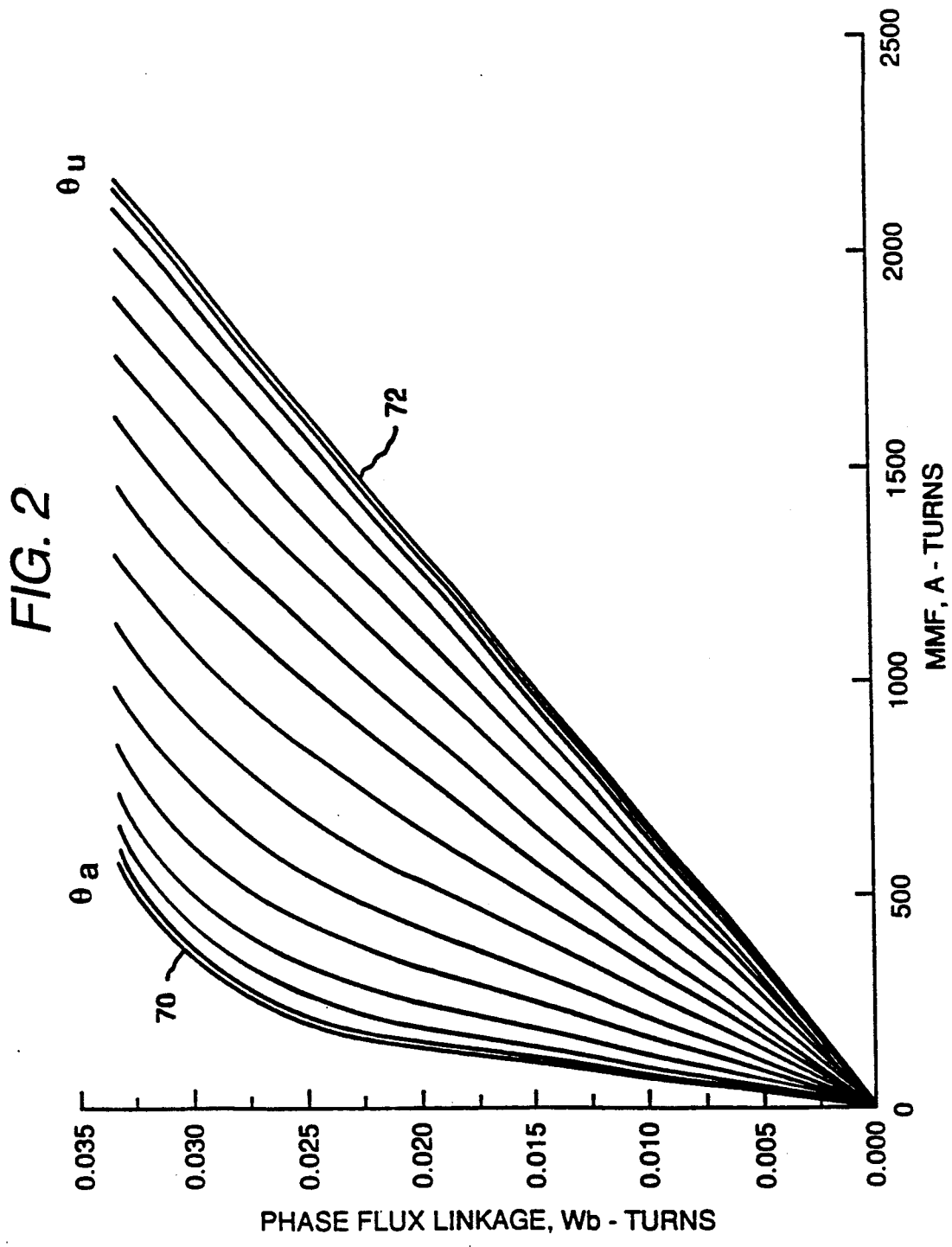

DISCRETE POSITION ESTIMATOR FOR A SWITCHED RELUCTANCE MACHINE USING A FLUX-CURRENT MAP COMPARATOR

RELATED APPLICATIONS

This application is related to commonly assigned, copending U.S. patent application of J. P. Lyons and S. R. MacMinn, Ser. No. 760,032, filed concurrently herewith and incorporated by reference herein.

FIELD OF THE INVENTION

The present invention relates generally to rotor position estimators for switched reluctance machines and, more particularly, to a discrete position estimator using a flux-current map comparator.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position; otherwise, the magnetic force of attraction would produce a negative or braking torque. Hence, by properly positioning the firing pulses relative to rotor angle, forward or reverse operation and motoring or generating operation can be obtained. Typically, the desired phase current commutation is achieved by feeding back the rotor position signal to a controller from a shaft angle transducer, e.g. an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the motor. One such approach, referred to as waveform detection, depends upon back electromotive forces (emf) and is, therefore, unreliable at low speeds and inoperative at zero speed.

Another approach to indirect rotor position sensing is disclosed in commonly assigned U.S. Pat. No. 4,772,839, issued Sep. 20, 1988 to S. R. MacMinn and P. B. Roemer, which patent is incorporated by reference herein. The cited patent describes an indirect position estimator for a SRM which applies low-level sensing pulses of short duration to the unenergized motor phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phases undergoes a change in state during sampling or in case two phases do not remain energized throughout the sampling, an extrapolator is provided to generate an extrapolated rotor angular position instead of the estimated position.

Still another approach to indirect rotor position sensing is disclosed in commonly assigned U.S. Pat. No. 4,959,596, issued to S. R. MacMinn, C. M. Stephens and P. M. Szczesny on Sep. 25, 1990, which patent is incorporated by reference herein. According to U.S. Pat. No. 4,959,596, a method of indirect rotor position sensing involves applying voltage sensing pulses to one unenergized phase. The result is a change in phase current which is proportional to the instantaneous value of the phase inductance. Proper commutation time is determined by comparing the change in phase current to a threshold current, thereby synchronizing phase excitation to rotor position. Phase excitation can be advanced or retarded by decreasing or increasing the threshold, respectively.

Even more recent approaches to indirect position estimation have been described in U.S. patent application No. 653,374 of J. P. Lyons and S. R. MacMinn, now allowed and U.S. patent application No. 653,371 of J. P. Lyons, M. A. Preston and S. R. MacMinn, now allowed, both filed Feb. 11, 1991 and assigned to the instant assignee. The indirect position estimating methods of the hereinabove cited Lyons et al. patent applications, which are incorporated by reference herein, each avoid active probing of the motor phases since such active probing usually imposes speed limitations on the machine. For example, according to Lyons et al. patent application No. 653,374, instantaneous phase current and flux measurements are performed in a predetermined sequence that depends on the particular quadrant of operation, i.e. forward motoring, reverse motoring, forward generating, or reverse generating. For each phase in the predetermined sequence of sensing, phase flux and phase current measurements are made during operation in a pair of predetermined sensing regions, each defined over a range of rotor angles. Rotor angle estimates are derived from the phase flux and phase current measurements for each respective phase during the respective sensing regions thereof. The rotor angle estimates for each phase are normalized with respect to a common reference phase, and a rotor position estimate for the SRM is computed therefrom.

Alternatively, the method of Lyons et al. patent application No. 653,371 involves a flux/current model of the machine, which model includes multi-phase saturation, leakage, and mutual coupling effects. The flux/current model includes a network mesh of stator, rotor and air gap reluctance terms. The network is driven by magnetomotive force terms corresponding to the ampere-turns applied to each of the stator poles. Phase current and flux sensing for each phase are performed simultaneously. The reluctance terms of the flux/current model are determined from the phase flux and current measurements. The phase current and flux measurements also determine the rotor position angle relative to alignment for each respective motor phase and which phase (or phases) is operating in its predetermined optimal sensing region defined over a range of rotor angles. The measurements on at least two phases are then used for establishing whether the stator phases of the sensing phase are approaching alignment or maximum unalignment with SRM rotor poles. Finally, the rotor position angle for the sensing phase and its position relative to alignment are used to provide a rotor position estimate for the motor.

As another alternative rotor position sensing technique, it is desirable to use a flux-current map to determine the commutating points of an SRM, which would result in a simple and economical rotor/stator synchronizing mechanism with minimal computational requirements.

SUMMARY OF THE INVENTION

A new and improved rotor position estimator for an SRM is provided which employs a flux-current map to determine whether the actual rotor angle is closer to, or farther from, axial alignment of stator and rotor poles than a reference angle $\theta_r$. The flux-current map is a plot of reference flux $\Psi_r$ as a function of current for the reference angle $\theta_r$. If a flux linkage estimate $\hat{\Psi}$ is greater than the reference flux $\Psi_r$, then the actual rotor angle is closer to alignment than the reference angle $\theta_r$, and the flux-map comparator output is a logic level one. On the other hand, if the flux linkage estimate $\hat{\Psi}$ is lower than the reference flux $\Psi_r$, then the actual rotor angle is farther from alignment than the reference angle $\theta_r$, and the flux-map comparator output is a logic level zero. When the result of the flux comparison causes the flux-current map comparator to change state, the actual rotor angle is equal to the reference angle $\theta_r$, with the result that phase currents can be commutated relative to this rotor position. The flux-current map can be implemented using either single-phase or multi-phase SRM characteristics.

BRIEF DESCRIPTION OF THE DRAWINGS

The features and advantages of the present invention will become apparent from the following detailed description of the invention when read with the accompanying drawings in which:

FIG. 2 is a graphical illustration of phase flux versus phase current for different values of rotor angle;

DETAILED DESCRIPTION OF THE INVENTION

Figure 1A:
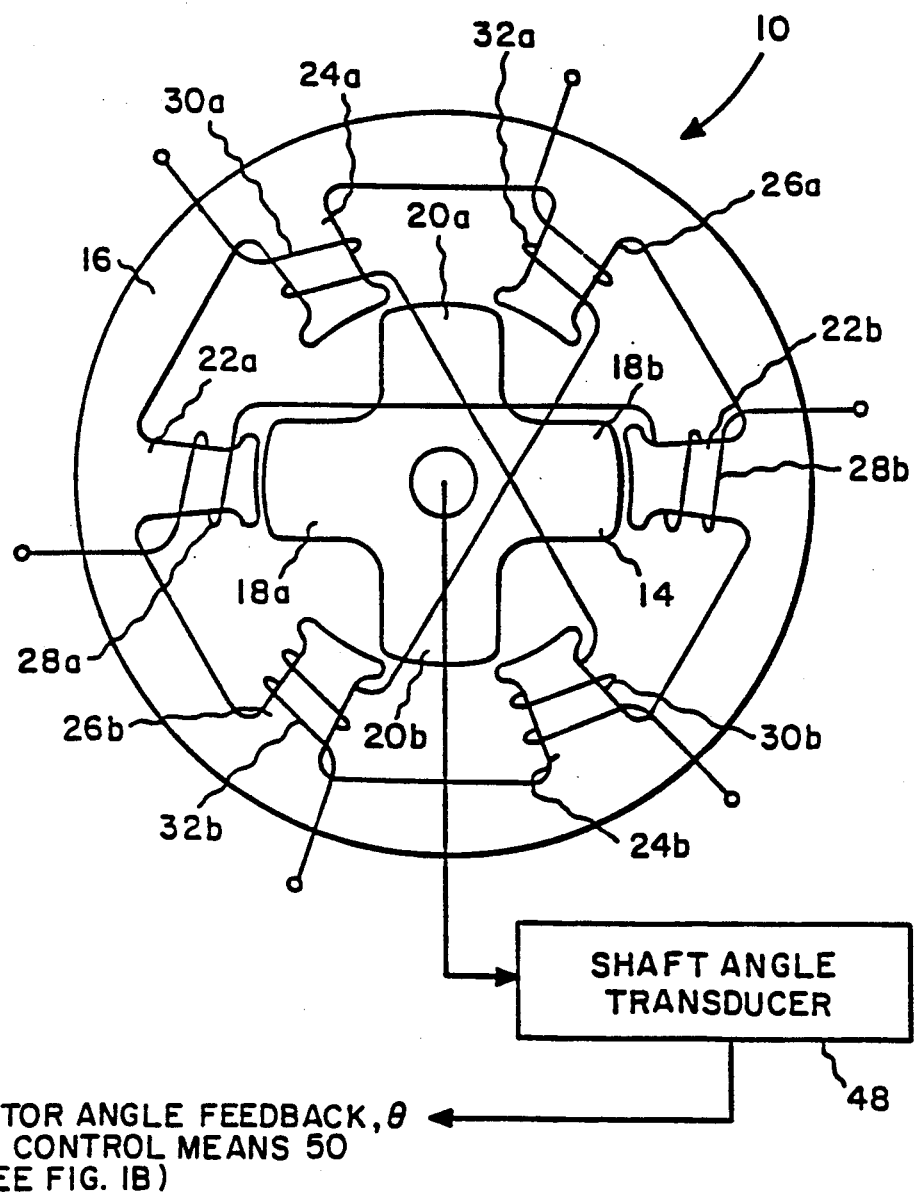
FIGS. 1a and 1b are a schematic illustrations of a conventional SRM drive.
Figure 1B:
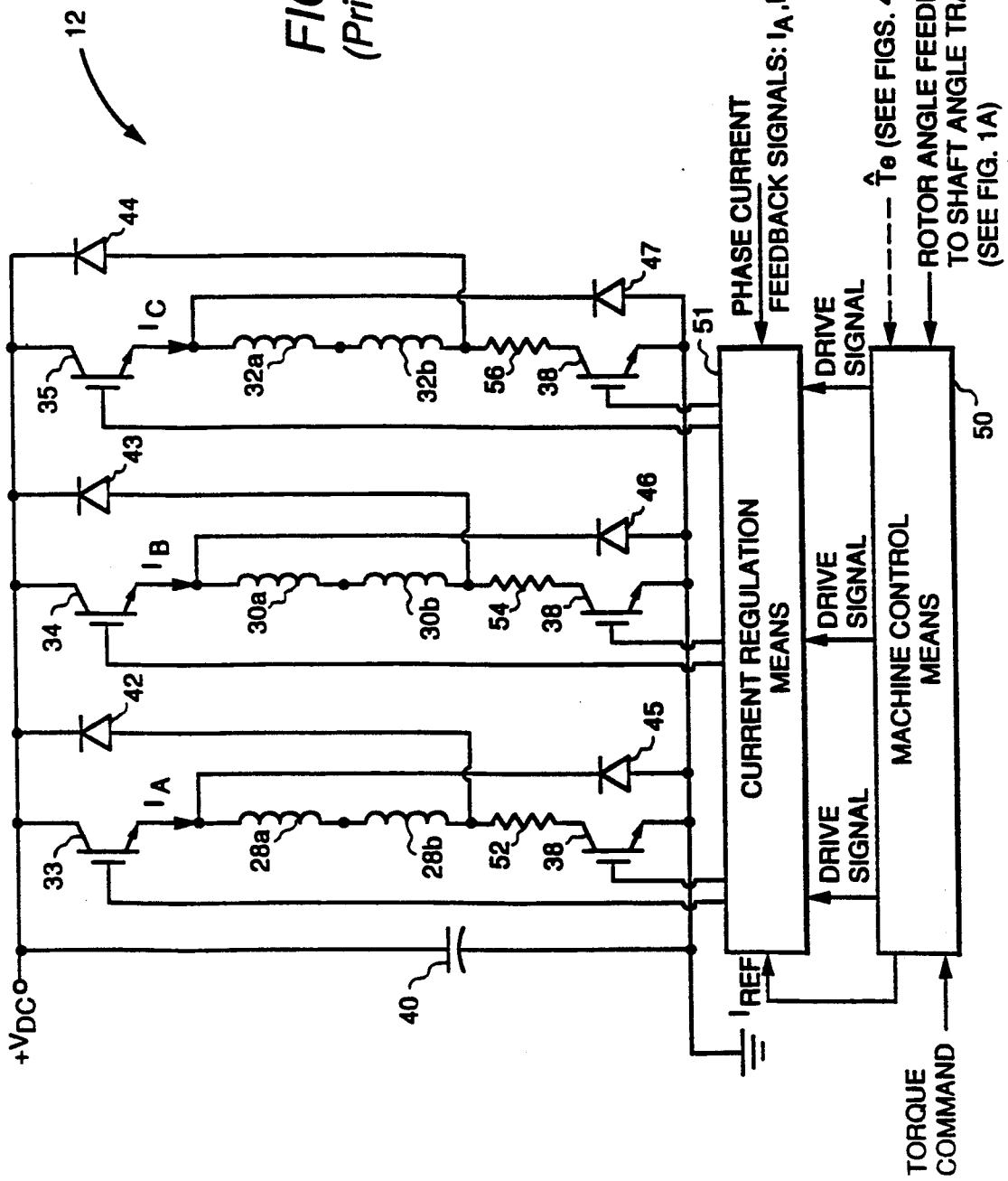

FIG. 1 shows a conventional SRM drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices are each illustrated as comprising an insulated gate bipolar transistor (IGT), but other suitable current switching devices may be used; for example, field effect transistors (FET's), gate turn-off thyristors (GTO's), or bipolar junction transistors (BJT's). Each phase winding is further coupled to a dc source, such as a battery or a rectified ac source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the dc source. Each series combination of the phase winding with two corresponding switching devices and two flyback diodes comprises one phase leg of inverter 12. The inverter phase legs are connected in parallel to each other and are driven by the dc source, which impresses a dc voltage $V_{dc}$ across the parallel inverter phase legs. Capacitance 40 is provided for filtering transient voltages from the dc source and for supplying ripple current to the inverter.

Typically, as shown in FIG. 1, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors 52, 54 and 56. Suitable current sensors are well-known in the art and may comprise, for example, Hall-effect sensors, sensing transformers, sensing transistors, or sensing resistors. Control means 50 further provides a Commanded reference current waveform $I_{REF}$ to current regulation means 51, as described in commonly assigned U.S. Pat. No. 4,961,038, issued to S. R. MacMinn on Oct. 2, 1990, which patent is incorporated by reference herein. In well-known fashion, such as described in commonly assigned U.S. Pat. No. 4,739,240, issued to S. R. MacMinn and P. M. Szczesny on Apr. 19, 1988, which patent is also incorporated by reference herein, the control means provides firing signals to inverter 12 for energizing the machine phase windings in a predetermined sequence, depending upon the particular quadrant of operation.

Saliency of both the rotor and stator of a SRM causes the machine to have an air gap of varying length. As a result, phase inductance as viewed from the stator phase windings is a strong function of rotor position. Specifically, phase inductance ranges from a maximum value $L_a$, corresponding to alignment of rotor poles with the stator poles of the respective phase, to a minimum value $L_u$, corresponding to maximum unalignment of rotor poles with the stator poles of the respective phase.

The current I in one phase winding of a SRM and the flux Ψ linked by that winding are related by the winding inductance L according to the following expression:

$$\psi = LI \quad (1)$$

Thus, if phase flux linkage Ψ is plotted against phase current I, the slope of the resulting graph is the phase inductance. FIG. 2 graphically illustrates phase flux Ψ versus magnetomotive force (mmf, in ampere-turns) for different values of rotor angle θ. The bending of the curves at the higher values of flux Ψ is caused by magnetic saturation of the iron in the motor. Curve 70, which has the steepest initial slope, represents the Ψ-I curve for the excited phase when the stator poles of that phase are aligned with rotor poles, the rotor angle corresponding thereto being designated as $\theta_a$. On the other hand, curve 72, which has the smallest initial slope, represents the Ψ-I curve for the excited phase when the stator poles of that phase are at the point of maximum unalignment with rotor poles of the SRM, the rotor angle corresponding thereto being designated as $\theta_u$. The curves falling between curves 70 and 72 represent intermediate inductance values corresponding to varying degrees of rotor and stator pole overlap, with the slopes of the curves monotonically decreasing as the rotor advances from the aligned position to the unaligned position.

Figure 3:
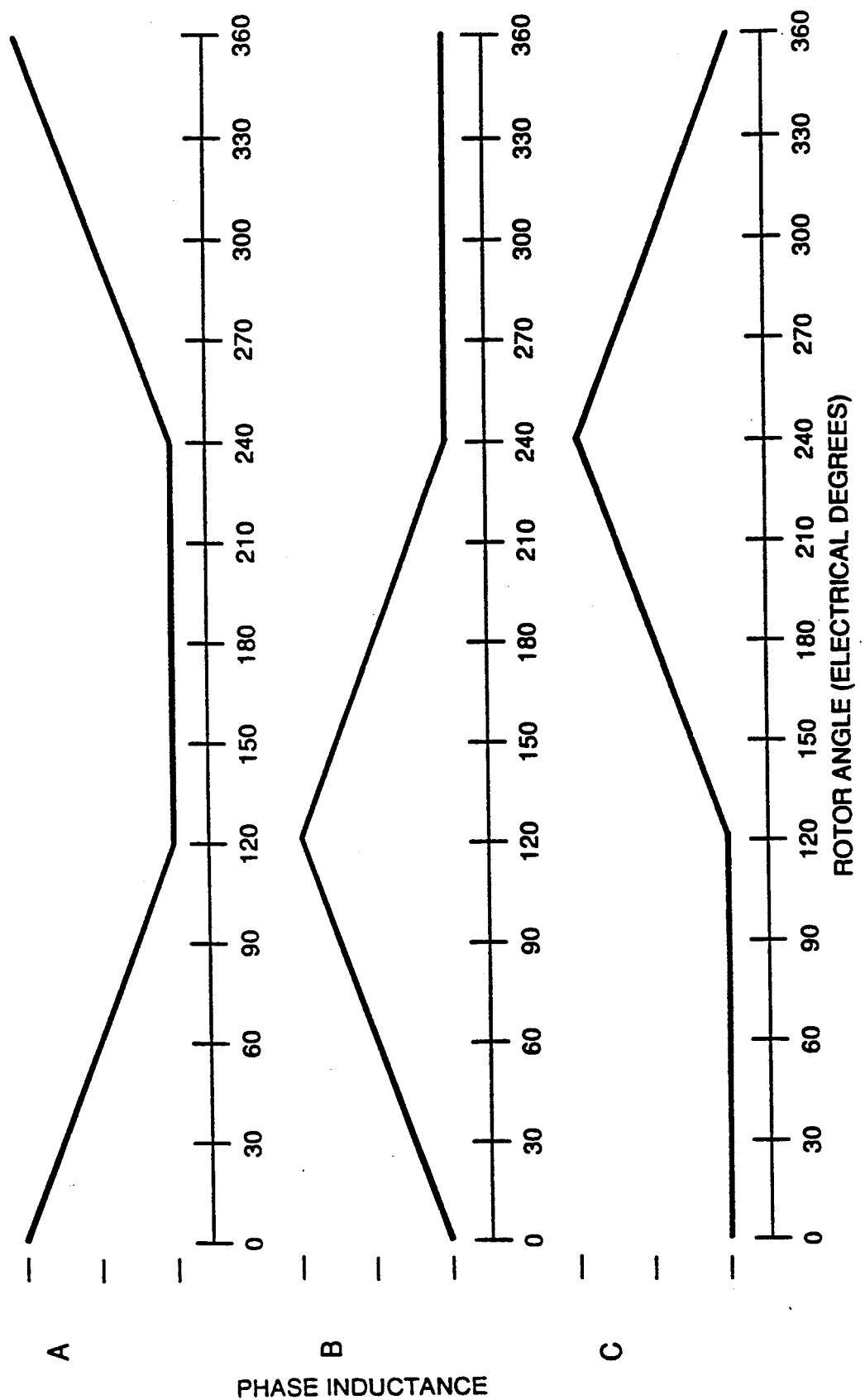
FIG. 3 is a graphical illustration of ideal phase inductance as a function of rotor angle for a three-phase SRM.

Ideal phase inductance (i.e., neglecting saturation and leakage flux) is plotted as a function of rotor angle θ, in electrical degrees, for a three-phase machine in FIG. 3. (As will be appreciated by those skilled in the art, in a SRM having a three-phase, 6-4 pole configuration, such as that illustrated in FIG. 1, a mechanical degree is one-fourth of an electrical degree. However, since electronic commutation is the concern herein, all positions will be described in terms of electrical degrees.) In particular, phase inductance L is a two-valued function of rotor position θ. That is, a given inductance value occurs once as the rotor poles are moving toward alignment with stator poles of a respective phase, and again as the poles are moving away from alignment. From equation (1), it is apparent that this value of inductance can be determined by corresponding measurements of phase flux Ψ and phase current I. To this end, stator flux linkage Ψ may be measured directly using well-known sensing coils; however, such coils are typically fragile and unreliable. Therefore, under most operating conditions, an accurate determination of phase flux linkage Ψ can be made by employing the relationship between phase flux linkage Ψ, phase current I, and phase voltage V according to the following expression:

$$V = Ir + d\Psi/dt, \quad (2)$$

where r is the phase winding resistance. An estimate of the flux linkage $\hat{\Psi}$ can thus be determined from:

$$\hat{\Psi} = \int (V - Ir) dt \quad (3)$$

Advantageously, since the flux linkage returns to zero at the end of each electrical cycle in a SRM, an integrator employed to estimate the flux linkage $\hat{\Psi}$ can be reset to zero at the end of each cycle, thus avoiding an accumulation of errors.

Figure 4:
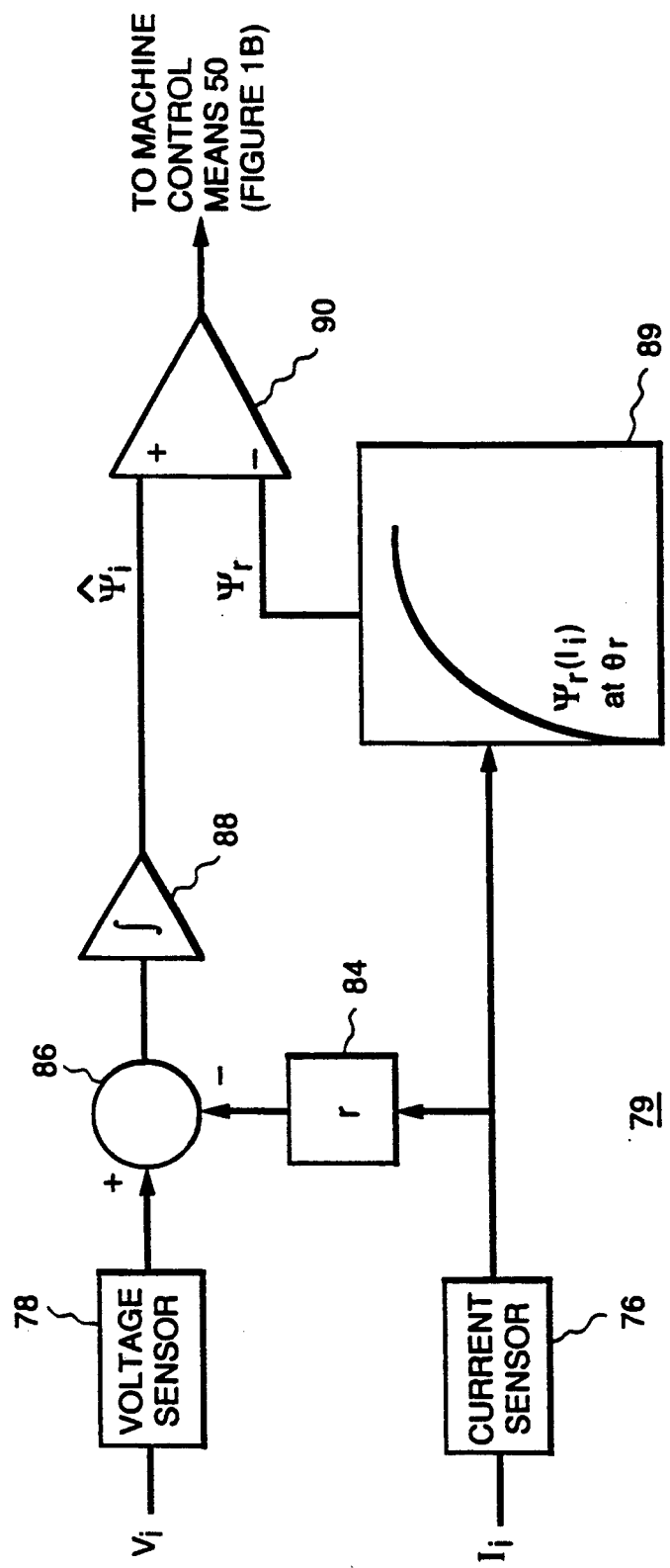
FIG. 4 is a block diagram of a preferred embodiment of a flux-current map comparator for rotor position estimation in accordance with the present invention.

FIG. 4 illustrates a block diagram of a rotor position estimator according to the present invention. Phase current $I_i$ is sensed by a suitable current sensor 76 (e.g., a Hall-effect sensor, sensing transformer, or sensing resistor), and phase voltage $V_i$ is sensed by a suitable voltage sensor 78 or is otherwise determined by a suitable indirect method for estimating voltage. The phase current $I_i$ is provided to a multiplier 84 wherein it is multiplied by the phase winding resistance r, and the result is subtracted from the phase voltage $V_i$ by a summer 86. The output signal from summer 86 is integrated in an integrator 88 to provide an estimate of the phase flux $\hat{\Psi}_i$. The phase current $I_i$ is also provided to a flux-current map block 89 which contains a flux-current map according to the expression:

$$\Psi_r = f(I_i) \text{ at } \theta_r, \quad (5)$$

where the functional relationship f corresponds to a Ψ-I curve for the particular reference angle $\theta_r$, such as the Ψ-I curves illustrated in FIG. 2. The function f could be easily modeled as a piecewise linear function using a combination of diodes and operational amplifiers according to methods well-known in the art. The flux estimate $\hat{\Psi}_i$ from integrator 88 is then compared with the flux reference $\Psi_r$ at reference angle $\theta_r$ in flux-current map comparator 90. If the flux linkage estimate $\hat{\Psi}_i$ is greater than the reference flux $\Psi_r$, then the actual angle is closer to alignment than the reference angle $\theta_r$, and the flux-map comparator output is a logic level one. On the other hand, if the flux linkage estimate $\hat{\Psi}_i$ is lower than the reference flux $\Psi_r$, then the actual angle is farther from alignment than the reference angle $\theta_r$, and the flux-map comparator output is a logic level zero. When the result of the flux comparison causes flux-current map comparator 90 to change state, the actual rotor angle is equal to the reference angle $\theta_r$; and a signal is sent to machine control means 50 (FIG. 1B) to commutate the phase currents relative to this rotor position.

Figure 5:
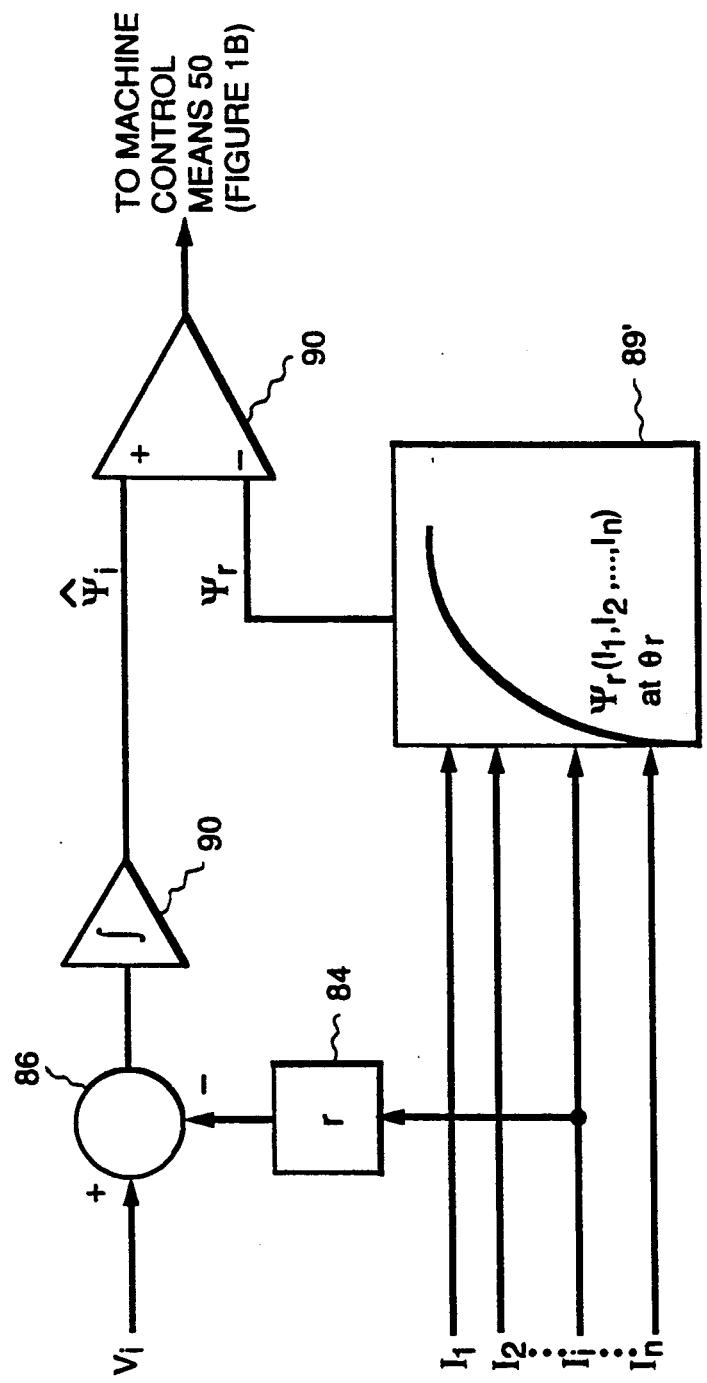
FIG. 5 is a block diagram of an alternative preferred embodiment of a flux-current map comparator for rotor position estimation in accordance with the present invention.

In an alternative embodiment, as shown in FIG. 5, the Ψ-I curve for the reference angle $\theta_r$ includes multiphase characteristics. In particular, equation (1) is extended to include multiple phase currents by incorporating the constant mutual coupling coefficients $M_{i1}$-- $M_{in}$ as follows:

$$\Psi_i = M_{i,1}I_1 + M_{i,2}I_2 + \ldots + L_i I_i + M_{i,i+1}I_{i+1} + \ldots + M_{i,n}I_n; \quad (6)$$

and equation (5) is thus rewritten as:

$$\Psi_r = f(I_1, I_2, \ldots I_n) \text{ at } \theta_r, \quad (7)$$

where $I_n$ are phase currents for an n-phase machine, and $\Psi_r$ still represents the reference flux linkage for a single phase. That is, as shown in FIG. 5, phase currents $I_1$ through $I_n$ are provided to a flux-current map block 89' which represents the function expressed by equation (7). The resulting flux reference $\Psi_r$ is compared to the phase flux estimate $\hat{\Psi}_i$ for a single-phase in comparator 90, taking into account some mutual coupling effects $M_{i1}$-$M_{in}$, as expressed in equation (6). Operation of the flux-current map comparator 90 is in the same fashion as described hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A rotor position estimator for a switched reluctance motor, comprising:
   current sensing means for sensing phase current in at least one phase of said switched reluctance motor;
   flux sensing means for sensing phase flux in at least said one phase of said switched reluctance motor and generating a phase flux estimate corresponding thereto;
   flux-current mapping means for receiving each respective phase current measurement and providing a phase flux reference corresponding to a predetermined rotor angle reference; and
   comparator means for comparing each respective phase flux estimate with said phase flux reference and generating a first logic level signal when the actual rotor angle is closer to axial alignment of the respective stator and rotor poles than said rotor angle reference, and generating a second logic level signal when the actual rotor angle is farther from axial alignment than said rotor angle reference, the output signal from said comparator means changing state when the actual rotor angle is equal to said rotor angle reference.

2. The rotor position estimator of claim 1 wherein said flux sensing means comprises:
   voltage sensing means for sensing the voltage V across the respective phase winding; and
   integrator means for providing an estimate of the phase flux $\hat{\Psi}$ according to the expression:

$$\hat{\Psi} = \int (V - Ir) dt,$$

where r is the phase winding resistance, and I is the phase current.

3. The rotor position estimator of claim 1 wherein said flux-current mapping means includes flux versus current data at said predetermined reference rotor angle.

4. The rotor position estimator of claim 1 wherein said flux-current mapping means includes flux versus current data, including mutual coupling effects due to multiple phase currents, at said predetermined reference angle.

5. A method for estimating the rotor position of a switched reluctance motor, comprising:
   sensing phase current in at least one phase said switched reluctance motor;
   sensing phase flux in at least said one phase of said switched reluctance motor and generating a phase flux estimate corresponding thereto;
   providing a phase flux reference corresponding to the phase current measurement and a predetermined rotor angle reference;
   comparing each respective phase flux estimate with said phase flux reference and generating a first logic level signal when the actual rotor angle is closer to axial alignment of the respective stator and rotor poles than said rotor angle reference, and generating a second logic level signal when the actual rotor angle is farther from axial alignment than said rotor angle reference; and
   indicating when the actual rotor angle is equal to said rotor angle reference by a change in state between the first and second logic level signals.

6. The method of claim 5 wherein the step of sensing phase flux comprises:
   sensing the voltage V across the respective phase winding; and
   providing an estimate of the phase flux $\hat{\Psi}$ according to the expression:

$$\hat{\Psi} = \int (V - Ir) dt,$$

where r is the phase winding resistance, and I is the phase current.

* * * * *